US011902740B2

(12) United States Patent
Sun et al.

(10) Patent No.: US 11,902,740 B2
(45) Date of Patent: Feb. 13, 2024

(54) HIGH-SENSITIVITY PIEZOELECTRIC MICROPHONE

(71) Applicant: WUHAN MEMSONICS TECHNOLOGIES CO., LTD., Wuhan (CN)

(72) Inventors: Chengliang Sun, Wuhan (CN); Bohao Hu, Wuhan (CN); Binghui Lin, Wuhan (CN); Zhipeng Wu, Wuhan (CN); Wei Zhu, Wuhan (CN); Lei Wang, Wuhan (CN); Yu Zhou, Wuhan (CN)

(73) Assignee: Wuhan MEMSonics Technologies Co., Ltd., Wuhan (CN)

( * ) Notice: Subject to any disclaimer, the term of this patent is extended or adjusted under 35 U.S.C. 154(b) by 166 days.

(21) Appl. No.: 17/681,871

(22) Filed: Feb. 28, 2022

(65) Prior Publication Data

US 2022/0182767 A1 Jun. 9, 2022

Related U.S. Application Data

(63) Continuation-in-part of application No. PCT/CN2020/105351, filed on Jul. 29, 2020.

(30) Foreign Application Priority Data

Aug. 28, 2019 (CN) ......................... 201910799686.8
Dec. 17, 2019 (CN) ......................... 201911299953.1

(51) Int. Cl.
*H04R 17/02* (2006.01)
*H04R 1/28* (2006.01)
(Continued)

(52) U.S. Cl.
CPC ........... *H04R 17/02* (2013.01); *H04R 1/2892* (2013.01); *H04R 1/406* (2013.01); *H04R 3/005* (2013.01); *H04R 2201/003* (2013.01)

(58) Field of Classification Search
CPC ...... H04R 17/02; H04R 1/2892; H04R 1/406; H04R 3/005; H04R 2201/003
See application file for complete search history.

(56) References Cited

U.S. PATENT DOCUMENTS

| | | | |
|---|---|---|---|
| 2015/0350792 | A1 | 12/2015 | Grosh et al. |
| 2018/0152788 | A1 | 5/2018 | Perletti et al. |

FOREIGN PATENT DOCUMENTS

| | | | |
|---|---|---|---|
| CN | 1174485 | A | 2/1998 |
| CN | 2882177 | A | 3/2007 |

(Continued)

OTHER PUBLICATIONS

English machine translation of CN208987176U (Luo et al.; Piezoelectric film microphone structure; published Jun. 2019) (Year: 2019).*

(Continued)

*Primary Examiner* — Mark Fischer
(74) *Attorney, Agent, or Firm* — Gang Yu

(57) ABSTRACT

A piezoelectric microphone, includes: a wafer substrate including a cavity; a plurality of cantilever beams with a piezoelectric deck structure; a fixed column; a plurality of flexible elastic members; and a connecting section. The plurality of cantilever beams each includes a fixed end and a free end suspended above the cavity. The plurality of cantilever beams is of a structure in which one end is narrow and the other end is wide, and the fixed end is relatively narrow. The fixed column is disposed at the center of the bottom surface of the cavity. The fixed ends of the plurality of cantilever beams are all connected to the top surface of the fixed column. A gap is provided between every two adjacent cantilever beams. The plurality of flexible elastic (Continued)

members is connected to free ends of two adjacent cantilever beams to enable the cantilever beams to vibrate synchronously.

20 Claims, 6 Drawing Sheets

(51) Int. Cl.
*H04R 1/40* (2006.01)
*H04R 3/00* (2006.01)

(56) References Cited

FOREIGN PATENT DOCUMENTS

| | | | |
|---|---|---|---|
| CN | 101321497 | A | 12/2008 |
| CN | 108362936 | A | 8/2018 |
| CN | 208043929 | U | 11/2018 |
| CN | 109348386 | A | 2/2019 |
| CN | 109474252 | A | 3/2019 |
| CN | 109587612 | A | 4/2019 |
| CN | 208987176 | U | 6/2019 |
| CN | 109982198 | A | 7/2019 |
| CN | 110545514 | A | 12/2019 |
| CN | 110602616 | A | 12/2019 |
| CN | 111050256 | A | 4/2020 |
| WO | 2012011256 | A | 9/2013 |

OTHER PUBLICATIONS

English machine translation of CN101321497A (Bharti et al.; ; Cantilevered bioacoustic sensor and method using same; published Dec. 2008) (Year: 2008).*

PCT Publication with ISR dated Mar. 4, 2021.

Priority CN application No. 201911299953 first search dated Jul. 29, 2020.

Priority CN application No. 201911299953 second search dated Dec. 21, 2020.

Priority CN application No. 201910799686 first search dated Jun. 28, 2020.

Priority CN application No. 201910799686 second search dated Jan. 15, 2021.

* cited by examiner

HIGH-SENSITIVITY PIEZOELECTRIC MICROPHONE

CROSS-REFERENCE TO RELATED APPLICATIONS

This application is a continuation-in-part of International Patent Application No. PCT/CN2020/105351 with an international filing date of Jul. 29, 2020, designating the United States, and further claims foreign priority benefits to Chinese Patent Application No. 201910799686.8 filed Aug. 28, 2019, and to Chinese Patent Application No. 201911299953.1 filed Dec. 17, 2019. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a high-sensitivity piezoelectric microphone.

A microphone is a device for converting a sound signal into an electric signal, and is widely used in equipment such as a microphone, a mobile phone, a personal computer (PC), and a vehicle-mounted voice recognition. After long-term development, the performance index of the microphone is more focused on intelligence, digitization and miniaturization currently. Nowadays, piezoelectric microphone technologies are increasingly integrated with the fields of aerospace, biomedicine, consumer electronics, information communication, military industry, and the like, and higher requirements are raised for the reliability and sensitivity of a microphone. Currently, capacitive microphones occupy a main market share, but the piezoelectric microphone will be widely applied in the future pneumatic acoustic field due to the advantages such as being durable, high in sensitivity, low in noise, and free of external power supply driving.

According to a structure of a conventional beam-type piezoelectric microphone, a fixed end of a beam is disposed on a periphery of a vibration region, and the impact of air damping on the performance of the device is not fully considered during design, resulting in a reduction in the sensitivity and a signal-to-noise ratio of the microphone. Therefore, a structure of a cantilever beam needs to be improved to make the performance of the microphone better.

A human-to-sound sensing frequency range is 20 Hz to 20 kHz. Therefore, a working frequency range of the piezoelectric microphone in the consumer electronics is 20 Hz to 20 kHz, and a resonance frequency of a piezoelectric microphone device generally needs to be greater than or equal to 2×20 kHz to 3×20 kHz. According to the conventional beam-type piezoelectric microphone, a cantilever beam with a piezoelectric deck is driven by sound pressure to vibrate, and the microphone converts a sound signal into an electric signal due to a positive piezoelectric effect. Therefore, the sensitivity of general piezoelectric microphones is closely related to, that is, positively correlated with, a sound pressure receiving area, and it is difficult to maintain the sensitivity of the microphone device while reducing an area of the device only by changing a structural form of the beam.

SUMMARY

An objective of the disclosure is to provide a high-sensitivity piezoelectric microphone, to improve the sensitivity of the microphone by changing a structural form of a cantilever beam in the piezoelectric microphone. In addition, a problem that the sensitivity of the microphone is reduced caused by a reduction in a sound pressure receiving area when an area of a microphone device is reduced is resolved.

To achieve the foregoing objective, a high-sensitivity piezoelectric microphone designed in the disclosure, comprising a wafer substrate comprising a cavity and a plurality of cantilever beams with a piezoelectric deck structure, the cantilever beam comprises a fixed end and a free end suspended above the cavity, the cantilever beam is of a structure in which one end is narrow and the other end is wide, and the relatively narrow end is the fixed end; and a fixed column is disposed at a center of a bottom surface of the cavity, the fixed ends of the plurality of cantilever beams are all connected to a top surface of the fixed column, a gap is provided between every two adjacent cantilever beams, the free ends of the adjacent cantilever beams are all connected to flexible elastic members that enable the cantilever beams to vibrate synchronously, and a connecting section used for leading out an electric signal of the cantilever beam is disposed in one gap.

In a class of this embodiment, the cantilever beam is in a shape of a sector or a trapezoid, and a formed sound pressure receiving region is circular or polygonal.

In a class of this embodiment, the cantilever beam has a trapezoidal structure and there are four cantilever beams, and the four cantilever beams enclose a rectangular structure.

In a class of this embodiment, the cantilever beam has a trapezoidal structure and there are six cantilever beams, and the six cantilever beams enclose a hexagonal structure.

In a class of this embodiment, the wafer substrate is a silicon on insulator (SOI) wafer substrate, a top surface of the wafer substrate, the top surface of the fixed column, and the cantilever beam are all an unimorph piezoelectric deck structure, and the piezoelectric deck structure sequentially comprises a bottom electrode, a piezoelectric film, and a top electrode from bottom to top.

In a class of this embodiment, the cantilever beam has an unimorph structure and sequentially comprises a support layer, the bottom electrode, the piezoelectric film, and the top electrode from bottom to top.

In a class of this embodiment, the connecting section connects the piezoelectric deck structure on the fixed column and the piezoelectric deck structure on the wafer substrate, and a bottom lead-out electrode used for leading out an electric signal of the bottom electrode and a top lead-out electrode used for leading out an electric signal of the top electrode are disposed on an outer side of the top surface of the wafer substrate.

In a class of this embodiment, an insulating layer is disposed between the bottom lead-out electrode and the top electrode.

In a class of this embodiment, the bottom electrodes and the top electrodes of the plurality of cantilever beams are all connected in parallel.

In a class of this embodiment, the flexible elastic member is an elastic waveform structure.

In a class of this embodiment, the wafer substrate is a Si wafer substrate, a top surface of the wafer substrate, the top surface of the fixed column, and the cantilever beam are all a bimorph piezoelectric deck structure, and the piezoelectric deck structure sequentially comprises a lower electrode, a first piezoelectric film, an intermediate electrode, a second piezoelectric film, and an upper electrode from bottom to top.

In a class of this embodiment, the cantilever beam has a bimorph structure and sequentially comprises the lower electrode, the first piezoelectric film, the intermediate electrode, the second piezoelectric film, and the upper electrode from bottom to top.

In a class of this embodiment, a mass block for reducing a resonance frequency of the cantilever beam is disposed at the free end.

In a class of this embodiment, the mass block is disposed above, below, or at an end portion of the free end of the cantilever beam.

In a class of this embodiment, the mass block disposed above the free end of the cantilever beam is formed by patterning a deposited material.

In a class of this embodiment, the mass block disposed below the free end of the cantilever beam is formed by performing back cavity etching on a substrate layer.

In a class of this embodiment, there are the plurality of cantilever beams, the gap is provided between every two adjacent cantilever beams, each cantilever beam comprises the fixed end fixedly connected to the substrate and the free end, and the mass block is disposed at each free end.

In a class of this embodiment, further comprising a fixed framework, the fixed framework is disposed on a periphery of the cantilever beam, a piezoelectric deck corresponding to the cantilever beam is disposed on the fixed framework, and a piezoelectric deck on the fixed end of the cantilever beam and the piezoelectric deck on the fixed framework are connected by a piezoelectric deck on the connecting section, to lead out an electric signal from the fixed framework.

A high-sensitivity piezoelectric microphone apparatus designed in the disclosure, comprising a plurality of high-sensitivity piezoelectric microphones connected in series or in parallel.

The advantageous effects of the disclosure are as follows.

In the disclosure, a structural form of a cantilever beam in a piezoelectric microphone is changed, to improve the sensitivity of the microphone. In addition, the impact of air damping is reduced when the cantilever beam vibrates, to improve a signal-to-noise ratio of the microphone. For a sectoral beam, it is easier to control the stress in a microelectromechanical systems (MEMS) micro-machining process, and the machining quality is better as compared with a trapezoidal beam or a beam of another shape. In addition, when a sound pressure receiving area is not changed, a quantity of cantilever beams is larger, and the sensitivity of a microphone device is slightly improved.

In the disclosure, a mass block for reducing a resonance frequency of the cantilever beam is disposed at a free end of the cantilever beam, and the mass block affects stiffness k and an equivalent mass m of a vibration system. An effective mass of the cantilever beam with the mass block on the free end becomes larger than that of the cantilever beam without the mass block under the excitation of a unit sound pressure, and a resonance frequency of vibration of the cantilever beam is greatly reduced by optimizing a size of the mass block. In addition, during vibration, the mass block on the free end of the cantilever beam has an inertia force, so that the cantilever beam has a larger degree of deflection, to improve a voltage output within a working frequency range (20 Hz to 20 kHz), and the microphone after the area is reduced can maintain the same resonance frequency and sensitivity as the microphone with the original area, that is, a new structure can also reduce an area of a microphone device while maintaining the same performance.

Further, a fixed framework is further included. The fixed framework is disposed on a periphery of the cantilever beam, a piezoelectric deck corresponding to the cantilever beam is disposed on the fixed framework, and a piezoelectric deck on the fixed end of the cantilever beam is connected to the piezoelectric deck on the fixed framework, to lead out an electrode from the fixed framework. When the cantilever arm is fixed to a periphery of a sound pressure receiving region, an end having a relatively large area of the beam is used as the fixed end, an end having a relatively small area of the beam is used as the free end, and the cantilever arm is directly connected to the fixed framework, to lead out a generated electric signal from the fixed framework. When the cantilever arm is fixed at the center of the sound pressure receiving region, the end having a relatively small area of the beam is used as the fixed end, and the end having a relatively large area of the beam is used as the free end. There are two electric signal leading out manners, one is that an electric signal is led to a wafer substrate with a circuit structure through silicon via (TSV) process at a fixed column part at the center, and the other is that the piezoelectric deck on the fixed column and the piezoelectric deck on the fixed framework are connected by disposing a connecting section, to lead out an electric signal from the fixed framework.

In the disclosure, a size of a single microphone may also be reduced. A plurality of microphone devices is arranged in the same area as the original microphone, where each device is equivalent to a signal source, the microphone devices are connected in series, to superimpose electric signals generated by the plurality of devices, thereby significantly improving the sensitivity of the microphone. The plurality of microphone devices is connected in parallel, to reduce an output impedance of a microphone component, so as to facilitate subsequent signal acquisition of a circuit to the microphone component.

Figure 1:
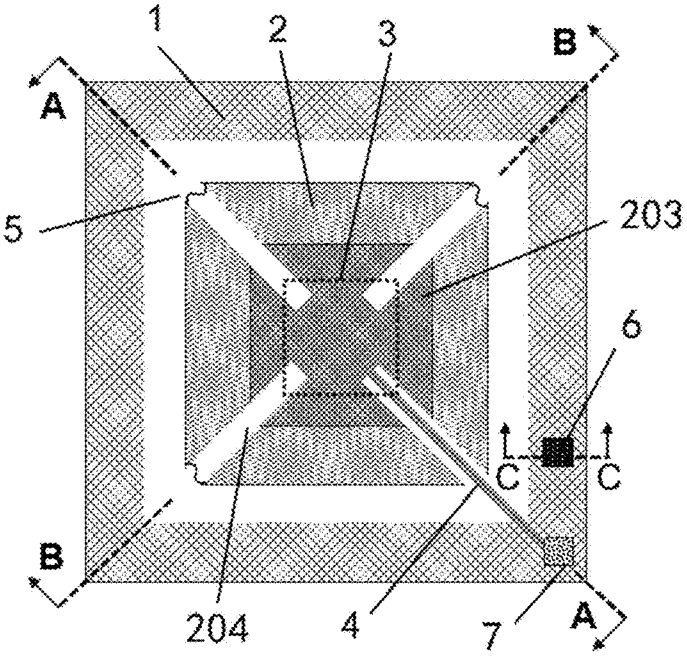
FIG. 1 is a top view of an unimorph microphone provided with four cantilever beams according to the disclosure.

In the drawings: 1—SOI wafer substrate, 101—first insulating layer, 102—transition layer, 103—second insulating layer, 104—cavity, 105—$SiO_2$ layer, 106—device substrate layer, 2—unimorph cantilever beam, 201—bottom electrode, 202—piezoelectric film, 203—top electrode, 204—gap, 3—fixed column, 4—connecting section, 5—flexible elastic member, 6—bottom lead-out electrode, 601—third insulating layer, 7—top lead-out electrode, 8—bimorph cantilever beam, 801—lower electrode, 802—first piezoelectric film, 803—intermediate electrode, 804—second piezoelectric film, 805—upper electrode, 806—first lead-out electrode, 807—second lead-out electrode, 808—fourth insulating layer, 9—Si wafer substrate, 10—fixed framework, 11—fixed region, 12—end having a relatively small area, 13—end having a relatively large area, 14—sound pressure receiving region, 15—mass block, 16—first signal end, and 17—second signal end.

DETAILED DESCRIPTION

The implementation solution and principle of the disclosure will be further described below with reference to the drawings.

Embodiment 1

As shown in FIG. 1, FIG. 2, FIG. 4, and FIG. 5, a high-sensitivity piezoelectric microphone, comprising a wafer substrate comprising a cavity 104 and a plurality of cantilever beams with a piezoelectric deck structure, the cantilever beam comprises a fixed end and a free end suspended above the cavity 104, the cantilever beam is of a structure in which one end is narrow and the other end is wide, and the relatively narrow end is the fixed end; and a fixed column 3 is disposed at a center of a bottom surface of the cavity 104, the fixed ends of the plurality of cantilever beams are all connected to a top surface of the fixed column 3, a gap 204 is provided between every two adjacent cantilever beams, the free ends of the adjacent cantilever beams are all connected to flexible elastic members 5 that enable the cantilever beams to vibrate synchronously, and a connecting section 4 used for leading out an electric signal of the cantilever beam is disposed in one gap 204.

As shown in FIG. 1, in this embodiment, the cantilever beam has a trapezoidal structure and there are four cantilever beams. Short sides of the trapezoidal structures of the cantilever beams are uniformly and fixedly connected to the fixed column 3 (a top view of the fixed column 3 is shown in a dashed line in the figure), so that the four cantilever beams enclose a rectangular structure. Further, the cantilever beams may enclose a square structure.

Embodiment 2

Figure 2:
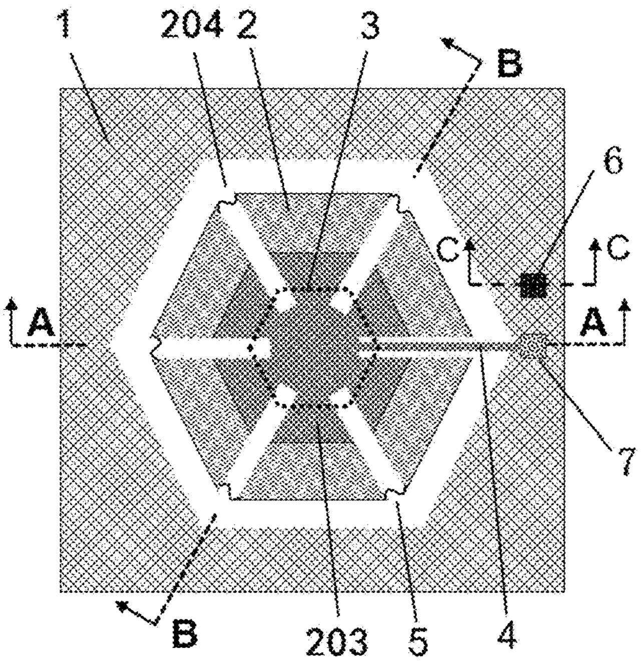
FIG. 2 is a top view of an unimorph microphone provided with six cantilever beams according to the disclosure.

As shown in FIG. 2, in this embodiment, the cantilever beam has a trapezoidal structure and there are six cantilever beams. Short sides of the trapezoidal structures of the cantilever beams are uniformly and fixedly connected to the fixed column 3 (a top view of the fixed column 3 is shown in a dashed line in the figure), so that the six cantilever beams enclose a hexagonal structure.

However, it should be understood that in another embodiment, there is any required quantity of piezoelectric cantilever beams and the structure thereof is in any shape provided that the structure of the cantilever beams is narrow at one end and wide at the other end, and the narrow ends are uniformly connected to the fixed column 3 to cause the cantilever beams to form a regular shape.

Embodiment 3

An example in which six cantilever beams in a trapezoidal structure enclose a regular hexagonal structure is used for description.

In this embodiment, a method for manufacturing an unimorph cantilever beam 2 is as follows.

Step 1. Select a silicon on insulator (SOI) wafer substrate with a cavity 104 for the wafer substrate, where the wafer substrate includes a first insulating layer 101, a transition layer 102, and a second insulating layer 103, both materials of the first insulating layer 101 and the second insulating layer 103 are silicon, and a material of the transition layer 102 is silicon dioxide.

Step 2. Generate an unimorph piezoelectric deck structure sequentially including a bottom electrode 201, a piezoelectric film 202, and a top electrode 203 from bottom to top on a top surface of the SOI wafer substrate 1 and a top surface of a fixed column 3 by deposition sputtering or the like, where a material of the bottom electrode 201 is molybdenum, a material of the piezoelectric film 202 is aluminum nitride, and a material of the top electrode 203 is molybdenum.

Step 3. Further pattern the top electrode 203, to retain the top electrode 203 close to a fixed end.

Step 4. Spin-coat photoresist on an upper surface of a device, clean and remove the photoresist of a part required to be etched after exposure, and sequentially etch the top electrode 203, the piezoelectric film 202, the bottom electrode 201, the second insulating layer 103, and the transition layer 102, to form a gap 204 between an unimorph cantilever beam 2 and an adjacent unimorph cantilever beam 2.

Figure 4:
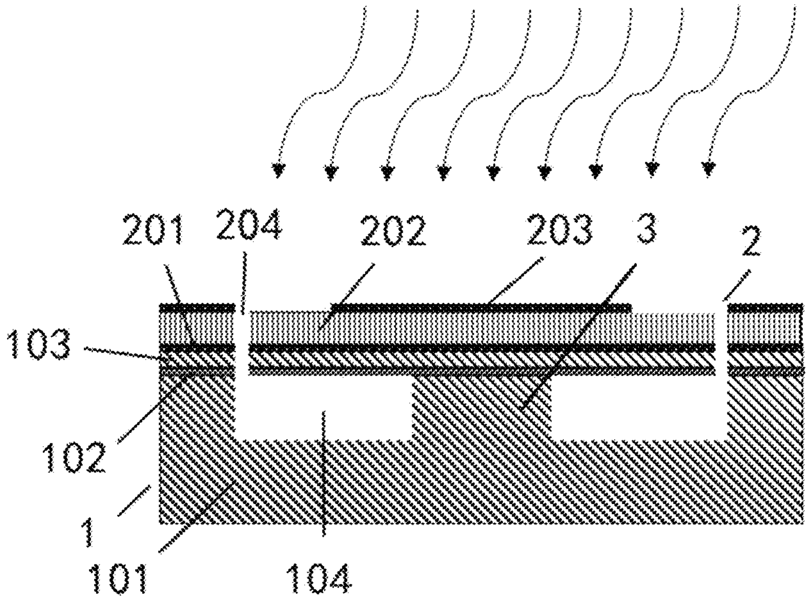
FIG. 4 is a B-B cross-sectional view of an unimorph microphone according to Embodiment 1, Embodiment 2, or Embodiment 3 of the disclosure.

As shown in FIG. 2 and FIG. 4, short sides of trapezoidal structures of the six unimorph cantilever beams 2 formed by etching are fixed to the top of the fixed column 3, and wide sides of the unimorph cantilever beams 2 are suspended above the cavity 104 to form free ends. In this embodiment, photoetching is performed on the top electrode 203 on the unimorph cantilever beam 2, and only a part of the top electrode 203 close to the fixed end is retained on the unimorph cantilever beam 2. During vibration, a stress strain of the unimorph cantilever beam 2 is mainly concentrated in a part close to the fixed end, and more charges are generated on an upper surface and a lower surface of a piezoelectric material of this part. Signal output of the microphone device can be effectively increased by arranging the top electrode 203 in this way. The free end of the unimorph cantilever beam 2 has a larger area than the fixed end, which is opposite to a structure of an unimorph cantilever beam 2 disposed in a microphone product launched by the Vesper company. Under the same device area and the same sound intensity, the amplitude vibration of a sound wave received by the free end is larger, the unimorph cantilever beam 2 generates a larger stress strain, an output electric signal is stronger, and the sensitivity is higher. In particular, to weaken signal crosstalk caused by asynchronous vibration of the plurality of unimorph cantilever beams 2, a flexible elastic member 5 is etched between the free ends of adjacent unimorph cantilever beams 2, and the flexible elastic member 5 is disposed in the gap 204, so that the unimorph cantilever beams 2 can vibrate synchronously, thereby weakening the signal crosstalk. The flexible elastic member 5 and the unimorph cantilever beam 2 can be obtained simultaneously by patterning etching. When the effective electrode is a flat electrode, the piezoelectric microphone works in D31 mode; when the effective electrode is an interdigital electrode, it works in D33 mode. The device can also operate as a resonant MEMS microphone, and its sensitivity to frequency drift will also be higher due to greater stress caused by unit sound pressure.

Figure 3:
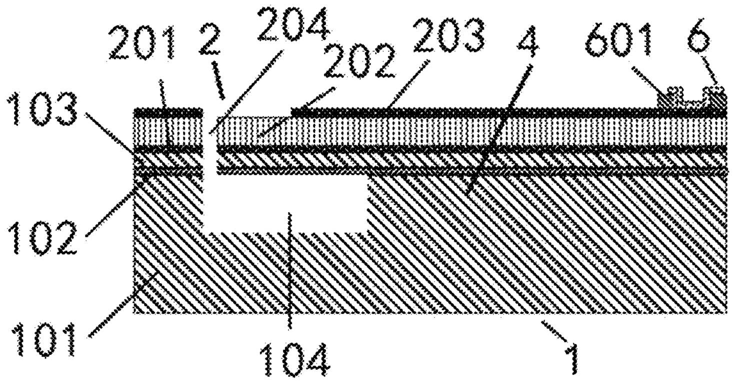
FIG. 3 is an A-A cross-sectional view of an unimorph microphone according to Embodiment 1, Embodiment 2, or Embodiment 3 of the disclosure.
Figure 5:
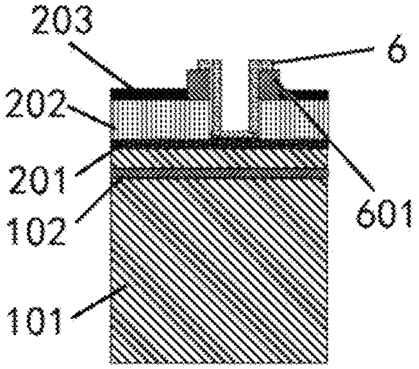
FIG. 5 is a C-C cross-sectional view of an unimorph microphone according to Embodiment 1, Embodiment 2, or Embodiment 3 of the disclosure.

As shown in FIG. 2 and FIG. 3, a connecting section 4 used for leading out an electric signal is disposed in one of the gaps 204 at a right side, and the connecting section 4 can lead out electric signals on the bottom electrode 201 and the top electrode 203 on the unimorph cantilever beam 2 and the fixed column 3. As shown in FIG. 3, in a structural form thereof, a customized SOI wafer substrate 1 provided with a required cavity 104 is selected, and a structure of the connecting section 4 is retained in the cavity 104 when the cavity 104 is formed by etching. The connecting section 4 is configured to connect a piezoelectric deck structure on the fixed column 3 and an outer part of a piezoelectric deck structure on the SOI wafer substrate 1. A bottom lead-out electrode 6 used for leading out an electric signal on the bottom electrode 201 and a top lead-out electrode 7 used for leading out an electric signal on the top electrode 203 are respectively disposed on a top surface of the SOI wafer substrate 1 close to an outer side, to output the electric signals. The electric signals generated by the unimorph cantilever beam 2 and the fixed column 3 are led out by using the connecting section 4, the bottom electrode 201 of each unimorph cantilever beam 2 is connected to the bottom lead-out electrode 6, and the top electrode 203 of each unimorph cantilever beam 2 is connected to the top lead-out electrode 7, so that the unimorph cantilever beams 2 are connected in parallel. As shown in FIG. 3 and FIG. 5, when the electric signals on the bottom electrode 201 and the top electrode 203 are led out, a third insulating layer 601 is deposited on an upper surface of the top electrode 203 on the top surface of the SOI wafer substrate 1, and the third insulating layer 601 is etched to a specific degree until the bottom electrode 201 and the top electrode 203 are exposed. A metal layer is further deposited and the metal layer is further photolithographically patterned, to form the top lead-out electrode 7 and the bottom lead-out electrode 6. A material of the third insulating layer 601 is silicon dioxide, and materials of the top lead-out electrode 7 and the bottom lead-out electrode 6 may be aluminum, gold, or the like.

As shown in FIG. 4, a sound wave signal is transmitted to a microphone through media such as air, to cause vibration of the unimorph cantilever beam 2. Due to a positive piezoelectric effect, heterocharges are generated on an upper surface and a lower surface of the piezoelectric film 202 in the unimorph cantilever beam 2, and the electric signals are led out by using the bottom electrode 201 and the top electrode 203. A gap 204 with a specific width is retained between adjacent unimorph cantilever beams 2, so that the impact of air damping during vibration of the unimorph cantilever beam 2 can be reduced, and the interference caused by vibration of air in the cavity 104 to the vibration of the unimorph cantilever beam 2 can be reduced, thereby improving a signal-to-noise ratio of the microphone device.

Embodiment 4

Figure 6:
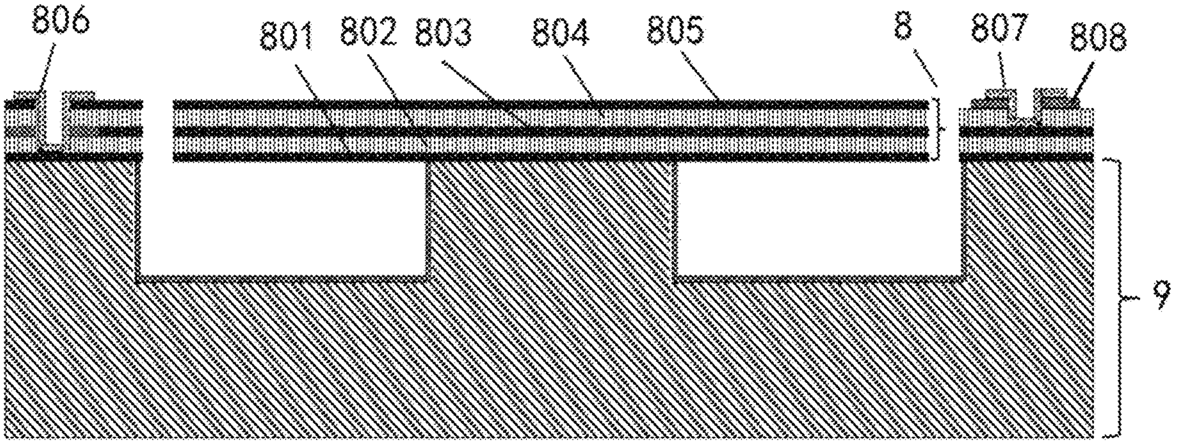
FIG. 6 is a cross-sectional view of a bimorph microphone according to Embodiment 4 of the disclosure.

As shown in FIG. 6, in this embodiment, the cantilever beam of the piezoelectric microphone may be made into a bimorph cantilever beam 8. Specifically, the piezoelectric microphone includes a Si wafer substrate 9. A lower electrode 801, a first piezoelectric film 802, an intermediate electrode 803, a second piezoelectric film 804, and an upper electrode 805 are formed on a top surface of the Si wafer substrate 9 from bottom to top by deposition sputtering or the like, and a cavity 104 with a fixed column 3 retained at the center, a plurality of bimorph cantilever beams 8, a gap 204 between adjacent bimorph cantilever beams 8, and a flexible elastic member 5 connected between free ends of the adjacent bimorph cantilever beams 8 and enabling the bimorph cantilever beam 8 to vibrate synchronously are formed by etching. The lower electrodes 801 and the upper electrodes 805 of the bimorph cantilever beams 8 are all connected in parallel, a connecting section 4 used for leading out an electric signal is disposed in one gap 204, and the connecting section 4, the fixed column 3, and the Si wafer substrate 9 are integrally formed by etching. During vibration of the bimorph cantilever beam 8, a structure layer in which a stress strain is 0 is referred to as a neutral axis, the neutral axis of the bimorph cantilever beam 8 is located in the intermediate electrode 803, and a stress strain on an upper portion of the neutral axis is opposite to that on a lower portion. When the bimorph cantilever beam 8 vibrates, a stress strain of the first piezoelectric film 802 is opposite to that of the second piezoelectric film 804, polarization directions of the two piezoelectric films 202 are the same, charge symbols generated on two surfaces of the first piezoelectric film 802 and the second piezoelectric film 804 that are in contact with the intermediate electrode 803 are the same, and charge symbols generated on a lower surface of the first piezoelectric film 802 and an upper surface of the second piezoelectric film 804 are the same. According to a distribution characteristic of the generated charges, when an electrode is led out, electric signals of the lower electrode 801 and the upper electrode 805 are led out by using a first lead-out electrode 806, and an electric signal of the intermediate electrode 803 is led out by using a second lead-out electrode 807. A fourth insulating layer 808 separated from the upper electrode 805 is disposed below the second lead-out electrode 807. The first lead-out electrode 806 and the second lead-out electrode 807 are disposed on an outer side of the top of the Si wafer substrate 9. Signal output of the MEMS piezoelectric microphone can be significantly increased through signal superimposition with this characteristic by using the bimorph cantilever beam 8, thereby improving the sensitivity of the device. However, it should be understood that a part of the structure of the bimorph cantilever beam 8 made by using the Si wafer substrate 9, which is not described in detail, is similar to that of the structure of the unimorph cantilever beam 2 made by using the SOI wafer substrate 1.

According to the technical solution, the sensitivity and the signal-to-noise ratio of the piezoelectric microphone can be effectively improved, a manufacturing process of the provided new structure is simple and is compatible with a complement metal-oxide-semiconductor (CMOS) process, which is convenient for mass production of mini microphones.

After an area of a microphone is reduced, a resonance frequency is increased significantly. In the disclosure, a mass block 15 is disposed above, below, or at an end portion of the free end of the cantilever beam, and the mass block 15 affects a stiffness k and an equivalent mass m of a vibration system. By adjusting the mass block 15, a resonance frequency of the vibration system can be reduced to a suitable range, a voltage output within a working frequency range can be increased, and the microphone after the area is reduced can maintain the same resonance frequency and sensitivity as the microphone with the original area, and even has a better effect.

Embodiment 5

Figure 7:
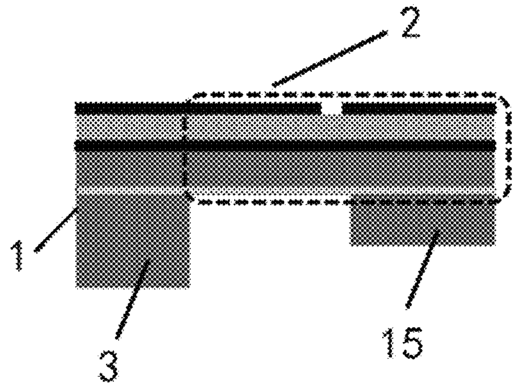
FIG. 7 is a schematic structural diagram of a high-sensitivity piezoelectric microphone according to Embodiment 5 of the disclosure.

This embodiment discloses a structure of a high-sensitivity piezoelectric microphone. As shown in FIG. 7, the structure includes an SOI wafer substrate 1 provided with a back cavity and an unimorph cantilever beam 2 fixed to the SOI wafer substrate 1. The unimorph cantilever beam 2 includes a fixed end fixedly connected to the SOI wafer substrate 1 and a free end connected to the fixed end and suspended above the back cavity. A mass block 15 is disposed below the free end, and a resonance frequency of a device is reduced by adjusting parameters of the mass block 15, thereby improving the sensitivity of the piezoelectric microphone. Generally, a plurality of substrates such as an SOI substrate, a Si substrate, and a sapphire substrate may be selected for the substrate of the piezoelectric microphone, and is suitable for microphones with various structures. A type of the substrate may be determined according to a structural form of the beam. The parameters of the mass block 15 to be adjusted may be flexibly adjusted as required, the adjusted parameters of the mass block 15 include a size, a shape, a material, a distance from the fixed end, and the like, and the parameters are finally converted to an equivalent mass and an equivalent distance.

According to the principle and the purpose of disposing the mass block 15, it is obvious that the mass block 15 may not only be disposed below the free end, but also may be disposed above or at an end portion of the free end of the cantilever beam. The mass block 15 disposed above the free end of the cantilever beam may be made by patterning a deposited material. The mass block 15 disposed below the free end of the cantilever beam arm may be made by performing back cavity etching on the SOI wafer substrate 1.

Further, the cantilever beam may have an unimorph structure and sequentially includes a support layer, a bottom electrode 201, a piezoelectric film 202, and a top electrode 203 from bottom to top, or the cantilever beam may have a bimorph structure and sequentially includes a lower electrode 801, a first piezoelectric film 802, an intermediate electrode 803, a second piezoelectric film 804, and an upper electrode 805 from bottom to top.

Further, the structure further includes a fixed framework 10. The fixed framework 10 is disposed on an outer periphery of the cantilever beam, and a piezoelectric deck corresponding to the cantilever beam is disposed on the fixed framework 10. A piezoelectric deck on the fixed end of the cantilever beam is connected to the piezoelectric deck of the fixed framework 10, and an electric signal generated by the cantilever beam is led out from the fixed framework 10.

Embodiment 6

In this embodiment, this embodiment discloses a structure of a high-sensitivity piezoelectric microphone, including an SOI wafer substrate 1 provided with a back cavity and an unimorph cantilever beam 2 fixed to the SOI wafer substrate 1. The unimorph cantilever beam 2 includes a fixed end fixedly connected to the SOI wafer substrate 1 and a free end connected to the fixed end and suspended above the back cavity. A mass block 15 is disposed below the free end, and a resonance frequency of a device is reduced by adjusting parameters of the mass block 15, thereby improving the sensitivity of the piezoelectric microphone. Generally, a plurality of substrates such as an SOI substrate, a Si substrate, and a sapphire substrate may be selected for the substrate of the piezoelectric microphone, and is suitable for microphones with various structures. A type of the substrate may be determined according to a structural form of the beam.

According to the principle and the purpose of disposing the mass block 15, it is obvious that the mass block 15 may not only be disposed below the free end, but also may be disposed above or at an end portion of the free end of the cantilever beam. The mass block 15 disposed above the free end of the cantilever beam may be made by patterning a deposited material. The mass block 15 disposed below the free end of the cantilever beam arm may be made by performing back cavity etching on the SOI wafer substrate 1.

Further, the cantilever beam has a unimorph structure and sequentially includes a support layer, a bottom electrode 201, a piezoelectric film 202, and a top electrode 203 from bottom to top.

Further, the structure further includes a fixed framework 10. The fixed framework 10 is disposed on an outer periphery of the cantilever beam, and a piezoelectric deck corresponding to the cantilever beam is disposed on the fixed framework 10. A piezoelectric deck on the fixed end of the cantilever beam is connected to the piezoelectric deck of the fixed framework 10, and an electric signal generated by the cantilever beam is led out from the fixed framework 10.

Further, a shape of the unimorph cantilever beam 2 is an isosceles trapezoid, a thickness of the support layer is 5 μm, a thickness of the bottom electrode 201 is 0.2 μm, a thickness of the piezoelectric film 202 is 1 μm, a thickness of the top electrode 203 is 0.2 μm, a width of the fixed end is 80 μm, a width of the free end is 740 μm, a length of the unimorph cantilever beam 2 is 330 μm, and a resonance frequency thereof is about 90 kHz. A Si mass block 15 is added below the free end of the unimorph cantilever beam 2. The mass block 15 is a trapezoidal platform with a bottom width of 740 μm, an upper width of 680 μm, and a height and a thickness of 30 μm, a resonance frequency of a newly formed piezoelectric cantilever beam is reduced to about 55 kHz, and the sensitivity within an audible range (20 Hz to 20 kHz) is improved by about 2 dB.

Embodiment 7

Figure 8:
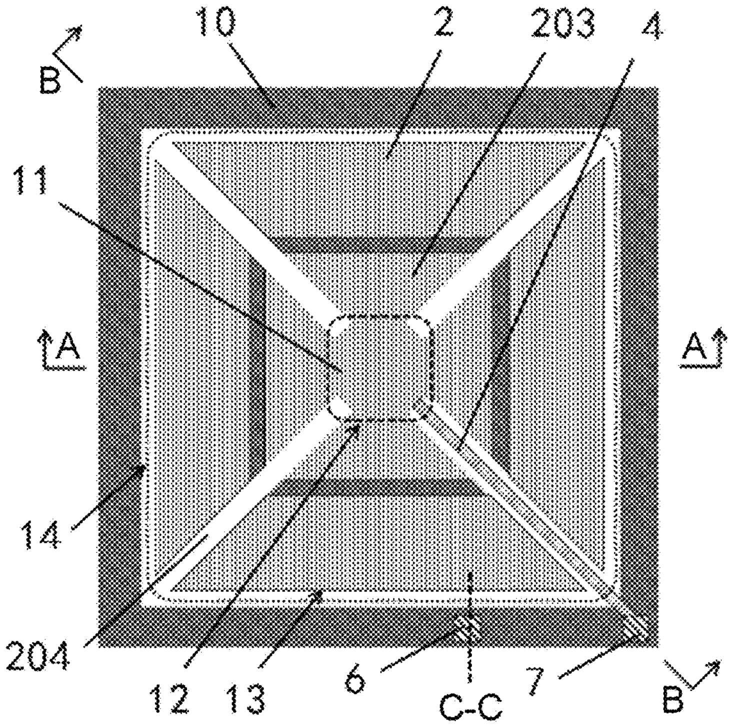
FIG. 8 is a top view of a piezoelectric microphone provided with four inverted trapezoidal piezoelectric cantilever beams according to Embodiment 6 of the disclosure.

This embodiment discloses a piezoelectric microphone with four trapezoidal cantilever beams. As shown in FIG. 8, there are a plurality of cantilever beams, and a gap 204 with a specific width is retained between adjacent cantilever beams. In this embodiment, a trapezoid is selected to be the shape of the cantilever beam. Four trapezoidal cantilever beams form a sound pressure receiving region 14, and the sound pressure receiving region may be a rectangle or a square. An end having a relatively small area 12 of each cantilever beam is fixedly connected to a substrate, and the other end is used as a free end. Amass block 15 is disposed at each free end. Certainly, an end having a relatively large area 13 may alternatively be selected to be fixedly connected to a substrate, and the other end is used as a free end.

Figure 9:
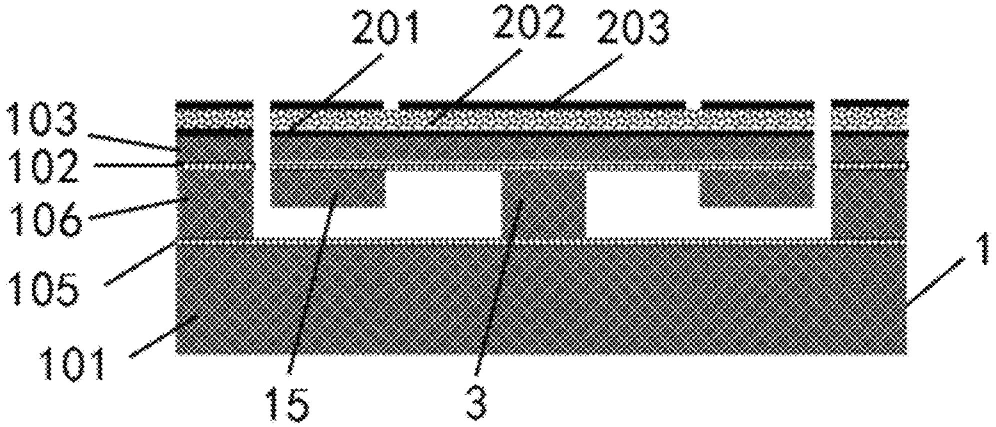
FIG. 9 is a cross-sectional view along a line A-A in FIG. 8.

In this embodiment, an SOI wafer substrate is selected for the substrate, and the substrate includes a device substrate layer 106, a transition layer 102, and a second insulating layer 103. A piezoelectric deck is above the SOI wafer substrate 1. As shown in FIG. 9, a bottom electrode 201, a piezoelectric film 202, and a top electrode 203 are deposited on the SOI wafer substrate 1. Alternatively, patterning etching is performed on the top electrode 203. Back cavity etching is performed on the SOI wafer substrate twice. The mass block 15 and the fixed column 3 are respectively obtained by etching by using the transition layer 102 as a stop layer for the second back cavity etching. The fixed column 3 is at the center of a vibration region, and the substrate needs to be bonded to fix the fixed column 3. If a fixed region 11 is disposed on an outer periphery of the vibration region, it is sufficient to perform back cavity etching is performed twice without additionally adding a substrate layer. A silicon wafer with thermal oxidation $SiO_2$ on a surface thereof is selected for the substrate layer, an upper layer is a $SiO_2$ layer 105, and a lower layer is a first insulating layer 101. Specifically, the first insulating layer 101 is a silicon substrate layer, and anode bonding processing is performed on the upper $SiO_2$ layer 105 and the device substrate layer 106 of the SOI wafer substrate 1 to form a Si—O bond, so as to fix the fixed column 3.

Figure 10:
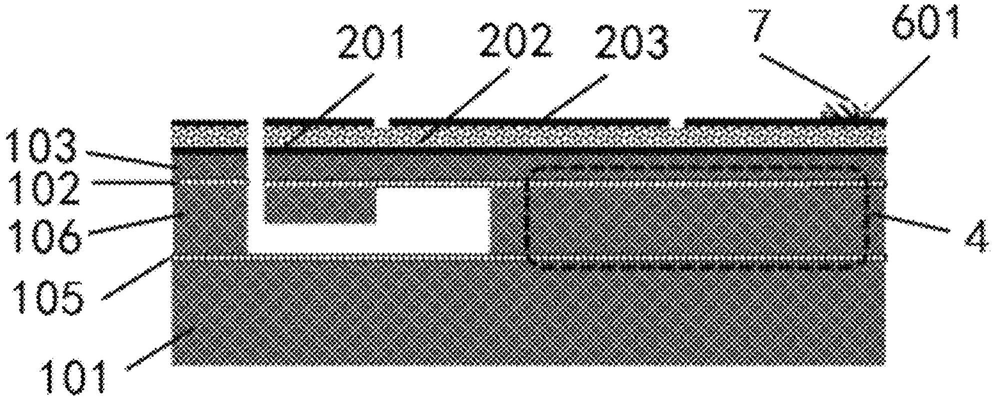
FIG. 10 is a cross-sectional view along a line B-B in FIG. 8.
Figure 11:
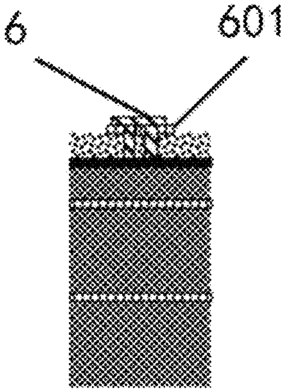
FIG. 11 is a cross-sectional view along a line C-C in FIG. 8.

A sound wave signal is transmitted to a microphone through media such as air, to cause vibration of the cantilever beam at the sound pressure receiving region 14. Due to a positive piezoelectric effect, heterocharges are generated on an upper surface and a lower surface of the piezoelectric film 202, and the electric signals are led out by using the bottom electrode 201 and the top electrode 203. The piezoelectric film 202 close to the fixed region 11 is subjected to a larger stress and has a larger surface polarization charge density, so that patterning etching is performed on the top electrode 203, and an electric signal is led out by using the top electrode 203 close to the fixed region 11. As shown in FIG. 10 and FIG. 11, a $SiO_2$ layer is deposited on a piezoelectric deck, a through hole is etched, and an Al or Au layer is deposited, and thereby upper and lower electrodes of the piezoelectric deck may be led out. A horizontal "tensile/pressure stress" received by the piezoelectric film 202 at the free end of the cantilever beam is extremely small, and almost no polarization charge is generated, while a "tensile/pressure stress" of the piezoelectric film 202 close to the fixed end is concentrated, so that a part of the top electrode 203 is etched away to separate the top electrodes 203 close to the fixed end and the free end, so that an electric signal is led out by using the top electrode 203 close to the fixed end.

Further, a fixed framework 10 may be further disposed on a periphery of the sound pressure receiving region 14 for receiving a sound pressure and formed by the unimorph cantilever beams 2, and as shown in FIG. 8, FIG. 9, and FIG. 10, a piezoelectric deck is also disposed on the fixed framework 10. An example of a structure in which the cantilever beam is fixed to the center of the sound pressure receiving region is used. A connecting section 4 may be further disposed in a gap 204 between adjacent cantilever beams, a piezoelectric deck of a vibration region is connected to the piezoelectric deck on the fixed framework 10 by a piezoelectric deck on the structure 8, and an electric signal is led out by using the connecting section 4. Therefore, an electric signal outputted by the microphone may be led out from the fixed framework 10. The free end in the structural form of the cantilever beam has a large area. Under the condition that an area of the sound pressure receiving region is not changed, the same sound pressure causes the deflection of the cantilever beam greater and the generated electric signal greater as compared with a cantilever beam fixed on the outer periphery.

When the bottom electrode 201 and the top electrode 203 on the fixed framework 10 are led out, a third insulating layer 601 may similarly be deposited on an upper surface of the top electrode 203, where $SiO_2$ may be selected for a material of the third insulating layer. Holes with a specific depth are respectively etched on the fixed framework 10, to expose the bottom electrode 201 and the top electrode 203, then a metal layer is deposited, where Al, Au, or the like may be selected for a material, and a top lead-out electrode 7 and a bottom lead-out electrode 6 are further formed by patterning etching.

Embodiment 8

This embodiment discloses a piezoelectric microphone with four sector cantilever beams. In this embodiment, a sector is selected for the shape of the cantilever beam, and a sound pressure receiving region formed by the four sector cantilever beams is circular. Other structures are the same as Embodiment 7.

Embodiment 9

Referring to FIG. 11, four microphones of which sizes are reduced are connected in series and have the same area as the microphone in the prior art. A mass block 15 at a free end of a cantilever beam 6 has the effect of reducing a resonance frequency and improving an output voltage within an operating frequency range (20 Hz to 20 kHz) for a device. The output performance of the single microphone of which the size is reduced keeps consistent with the original microphone with a large area by optimizing the mass block 15. The four microphones are connected in series, and electric signals generated by the four devices are superimposed on each other, and then led out by a first signal end 16 and a second signal end 17, which can effectively enhance the voltage sensitivity of the microphone.

Embodiment 10

Figure 12:
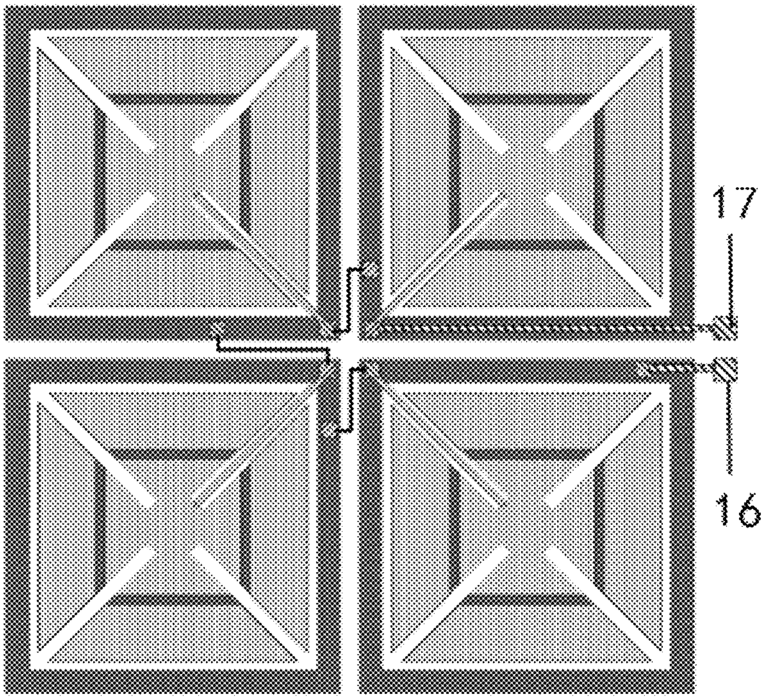
FIG. 12 is a top view of four microphones with a reduced size that are connected in series according to Embodiment 7 of the disclosure.
Figure 13:
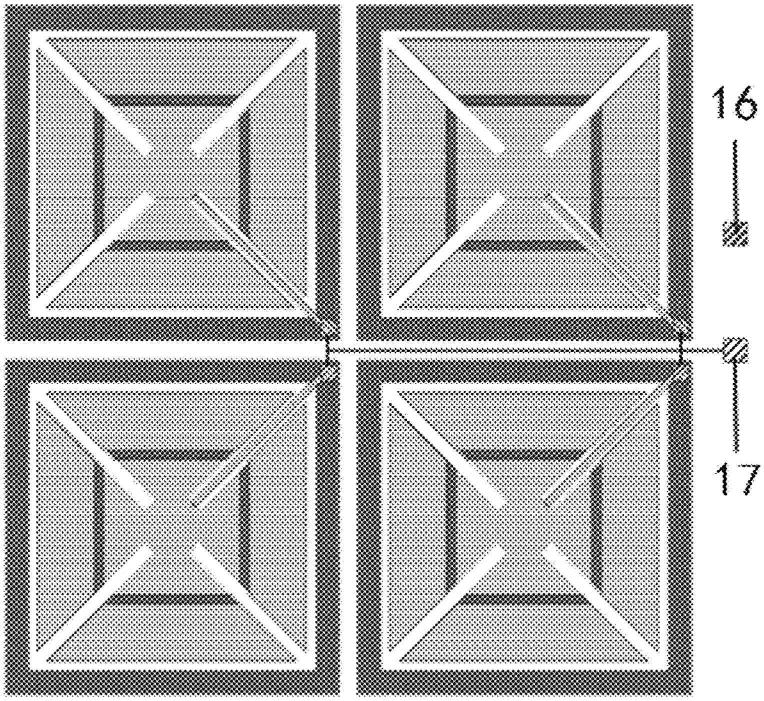
FIG. 13 is a top view of four microphones with a reduced size that are connected in parallel according to Embodiment 8 of the disclosure.

Referring to FIG. 12, four microphones with sizes reduced manufactured on a same wafer substrate share a bottom electrode 201 or a lower electrode 801. It is not necessary to lead out the bottom electrode 201 or the lower electrode 801 on a fixed framework 10 but on a first signal end 16. Top electrodes 203 of four microphone devices are connected to a second signal end 17 after being led out, and the four devices are connected in parallel, to reduce the output impedance of the microphone component, thereby facilitating leading out of electric signals.

In particular, according to the technical solution provided by the disclosure, it can ensure that the device has a good signal output when a size of a single microphone component is reduced, thereby improving the integration level of micro-nano manufacturing. By optimizing the size of the mass block 15, a higher electric signal can be generated under a unit area of a sound pressure receiving region, thereby improving the performance of the microphone. The selected embodiment of the disclosure is a microphone in consumer electronics with a working frequency of 20 Hz to 20 kHz. The working frequency of the microphone applied to the remaining fields will be adjusted.

It will be obvious to those skilled in the art that changes and modifications may be made, and therefore, the aim in the appended claims is to cover all such changes and modifications.

What is claimed is:

1. A piezoelectric microphone, comprising:

a wafer substrate comprising a cavity;

a plurality of cantilever beams with a piezoelectric deck structure;

a fixed column;

a plurality of flexible elastic members; and a connecting section;

wherein:

the plurality of cantilever beams each comprises a fixed end and a free end suspended above the cavity;

the plurality of cantilever beams is of a structure in which one end is narrow and the other end is wide, and the fixed end is relatively narrow;

the fixed column is disposed at a center of a bottom surface of the cavity; fixed ends of the plurality of cantilever beams are all connected to a top surface of the fixed column;

a gap is provided between every two adjacent cantilever beams;

the plurality of flexible elastic members is connected to free ends of two adjacent cantilever beams to enable the cantilever beams to vibrate synchronously; and the connecting section is disposed in one gap between every two adjacent cantilever beams for leading out an electric signal of the cantilever beams.

2. The microphone of claim 1, wherein the plurality of cantilever beams is in a shape of a sector or a trapezoid, and a formed sound pressure receiving region is circular or polygonal.

3. The microphone of claim 2, wherein the plurality of cantilever beams has a trapezoidal structure and is four in number, and the four cantilever beams enclose a rectangular structure.

4. The microphone of claim 2, wherein the plurality of cantilever beams has a trapezoidal structure and is six in number, and the six cantilever beams enclose a hexagonal structure.

5. The microphone of claim 2, wherein the wafer substrate is a silicon on insulator (SOI) wafer substrate; a top surface of the wafer substrate, the top surface of the fixed column, and the plurality of cantilever beams are all an unimorph piezoelectric deck structure, and the piezoelectric deck structure sequentially comprises a bottom electrode, a piezoelectric film, and a top electrode from bottom to top.

6. The microphone of claim 5, wherein the plurality of cantilever beams has an unimorph structure and sequentially comprises a support layer, the bottom electrode, the piezoelectric film, and the top electrode from bottom to top.

7. The microphone of claim 5, wherein the connecting section connects the piezoelectric deck structure on the fixed column and the piezoelectric deck structure on the wafer substrate, and a bottom lead-out electrode used for leading out an electric signal of the bottom electrode and a top lead-out electrode used for leading out an electric signal of the top electrode are disposed on an outer side of the top surface of the wafer substrate.

8. The microphone of claim 7, wherein an insulating layer is disposed between the bottom lead-out electrode and the top electrode.

9. The microphone of claim 7, wherein bottom electrodes and top electrodes of the plurality of cantilever beams are all connected in parallel.

10. The microphone of claim 2, wherein the wafer substrate is a Si wafer substrate, a top surface of the wafer substrate, the top surface of the fixed column, and the plurality of cantilever beams are all a bimorph piezoelectric deck structure, and the piezoelectric deck structure sequentially comprises a lower electrode, a first piezoelectric film, an intermediate electrode, a second piezoelectric film, and an upper electrode from bottom to top.

11. The microphone of claim 10, wherein the plurality of cantilever beams has a bimorph structure and sequentially comprises the lower electrode, the first piezoelectric film, the intermediate electrode, the second piezoelectric film, and the upper electrode from bottom to top.

12. The microphone of claim 1, wherein operating electrodes of the cantilever beams are pattern etched into plate electrodes or arc interdigital electrodes.

13. The microphone of claim 1, wherein the flexible elastic member is an elastic waveform structure.

14. The microphone of claim 1, wherein a mass block for reducing a resonance frequency of the plurality of cantilever beams is disposed at the free end.

15. The microphone of claim 14, wherein the mass block is disposed above, below, or at an end portion of the free end of the plurality of cantilever beams.

16. The microphone of claim 15, wherein the mass block disposed above the free end of the plurality of cantilever beams is formed by patterning a deposited material.

17. The microphone of claim 15, wherein the mass block disposed below the free end of the plurality of cantilever beams is formed by performing back cavity etching on a substrate layer.

18. The microphone of claim 14, wherein the gap is provided between every two adjacent cantilever beams, each cantilever beam comprises the fixed end fixedly connected to the wafer substrate and the free end, and the mass block is disposed at each free end.

19. The piezoelectric microphone of claim 14, further comprising a fixed framework, wherein the fixed framework is disposed on a periphery of the plurality of cantilever beams, a piezoelectric deck corresponding to the cantilever beams is disposed on the fixed framework, and a piezoelectric deck on the fixed end of the cantilever beams and the piezoelectric deck on the fixed framework are connected by a piezoelectric deck on the connecting section, to lead out an electric signal from the fixed framework.

20. A piezoelectric microphone apparatus, comprising a plurality of piezoelectric microphones of claim 1 connected in series or in parallel.

* * * * *